United States Patent
Kimoto (10) Patent No.: US 9,378,439 B2
(45) Date of Patent: Jun. 28, 2016

(54) IMAGE FORMING APPARATUS FOR PRINTING AN ORIGINAL IMAGE AND AN IMAGE INDICATING SHEET REUSE

(71) Applicants: KABUSHIKI KAISHA TOSHIBA, Tokyo (JP); TOSHIBA TEC KABUSHIKI KAISHA, Tokyo (JP)

(72) Inventor: Taizo Kimoto, Edogawa Tokyo (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/632,989

(22) Filed: Feb. 26, 2015

(65) Prior Publication Data

US 2015/0294202 A1    Oct. 15, 2015

(30) Foreign Application Priority Data

Apr. 10, 2014   (JP) .................. 2014-080861

(51) Int. Cl.
*G06K 15/02* (2006.01)
*G03G 15/00* (2006.01)

(52) U.S. Cl.
CPC ........ *G06K 15/1868* (2013.01); *G03G 15/6585* (2013.01); *G03G 2215/00797* (2013.01)

(58) Field of Classification Search
CPC ............... G06K 15/1868; G03G 2215/00797; G03G 15/6585
See application file for complete search history.

(56) References Cited

U.S. PATENT DOCUMENTS

| | | | | |
|---|---|---|---|---|
| 2009/0154970 A1* | 6/2009 | Yoshida | ............. | G03G 15/6588 399/341 |
| 2010/0196063 A1 | 8/2010 | Iguchi et al. | | |
| 2012/0141175 A1* | 6/2012 | Fujiwara | ............ | G03G 15/6573 399/341 |
| 2013/0108339 A1* | 5/2013 | Mita | .................. | G03G 15/0136 399/341 |
| 2014/0199103 A1* | 7/2014 | Terada | ............... | G03G 15/6585 399/341 |

* cited by examiner

*Primary Examiner* — Sandra Brase
(74) *Attorney, Agent, or Firm* — Patterson & Sheridan, LLP (57) ABSTRACT

According to an embodiment, an image forming apparatus includes an image forming unit and a controller. The image forming unit prints an original image and a specific image in a recording medium. In a case where it is determined that the recording medium is a reused recording medium, the controller controls the image forming unit to newly print the specific image at a position different from a print position of the previously-printed specific image.

14 Claims, 7 Drawing Sheets

IMAGE FORMING APPARATUS FOR PRINTING AN ORIGINAL IMAGE AND AN IMAGE INDICATING SHEET REUSE

CROSS-REFERENCE TO RELATED APPLICATION

This application is based upon and claims the benefit of priority from the prior Japanese Patent Application No. 2014-080861, filed on Apr. 10, 2014, the entire contents of which are incorporated herein by reference.

FIELD

Embodiments described herein relates generally to an image forming apparatus which prints a specific image together with a printing original image in a recording medium using a decolorable color material.

BACKGROUND

An image forming apparatus has been known such as a printer and a multi-function peripheral (MFP) which prints an original image such as a text, a figure, and a picture in a recording medium (for example, a sheet) as a visible image. Further, an image forming apparatus having a function of printing a specific image at a predetermined position in the recording medium in addition to a function of printing the original image has been proposed. The image forming apparatus forms the specific image in the recording medium as an image unrecognizable for human eyes for maintaining security. The specific image unrecognizable for human eyes, for example, can be visualized by a method of irradiating the image with a light source having a specific wavelength.

Furthermore, in the image forming apparatus, there is proposed a technology in which an image is printed in the recording medium by a decolorable color material and the image of the decolorable color material is decolorized to reuse the recording medium. For example, the image forming apparatus performs an image forming process in which a toner image is formed in the recording medium using toner as the decolorable color material in an electrophotographic manner. Furthermore, the image forming apparatus performs a decolorization process in which the decolorable toner image is decolorized in a state where the decolorable toner image of the recording medium is heated at a temperature equal to or more than a decolorization temperature. The image forming apparatus repeatedly performs the image forming process and the decolorization process in order to reuse the recording medium.

Even when the decolorable toner image is decolorized by the image forming apparatus, the transparent decolorable toner itself is left in the decolorable toner. Therefore, for example, when the specific image is printed at a predetermined position (the same position) of the recording medium, the decolorable toner image of the specific image is overlapped on the decolorable toner left which is previously decolorized and left in the recording medium. Even when the overlapped decolorable toner image is heated at a temperature equal to or more than the decolorization temperature and decolorized, the decolorable toner image is stacked and left in the recording medium as a toner layer. In a case where the number of reused times (the number of repetitions of the image forming process) of the recording medium is increased, a thickness of the decolorable toner layer is increased. Basically, the decolorization process of the image is to make the image hardly recognized by humans, but there may be a phenomenon that the decolorized image floats up by the thickness of the decolorable toner layer and is visualized.

DETAILED DESCRIPTION

According to an embodiment, an image forming apparatus 1 includes an image acquisition unit, an image forming unit, and a controller. The image acquisition unit acquires an original image. The image forming unit forms the acquired original image in a recording medium using a decolorable color material. Furthermore, the image forming unit forms a specific image in the recording medium using the decolorable color material in a state of difficulty in visible inspection. The controller determines whether the recording medium is a reused recording medium. The controller arbitrarily determines a print position of the specific image in the recording medium. Furthermore, in a case where it is determined that the recording medium is the reused recording medium, the controller controls the image forming unit such that a new specific image is printed at a position different from the print position of the previously-printed specific image.

In the following, another embodiment will be described with reference to the drawings. In the drawings, the same symbols indicate the portions identical with or similar to each other.

Figure 1:
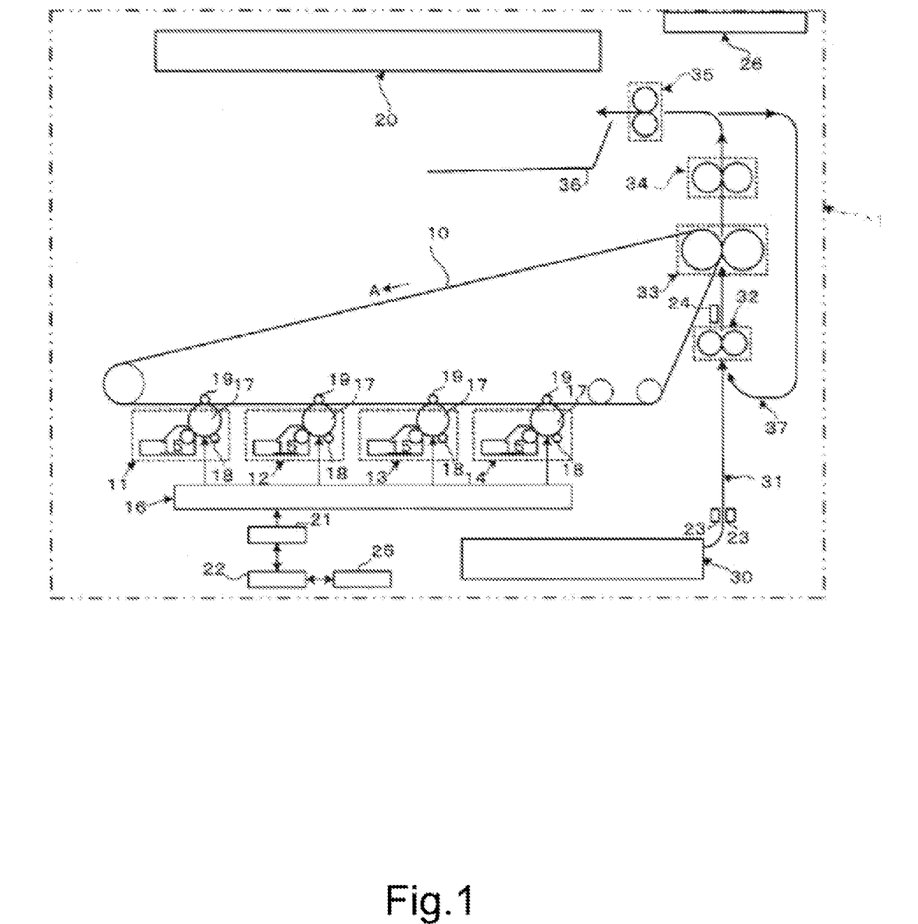
FIG. 1 is a cross-sectional view illustrating main parts of an image forming apparatus according to a first embodiment.

The image forming apparatus of a first embodiment will be described with reference to FIG. 1. FIG. 1 is a cross-sectional view illustrating main parts of the image forming apparatus according to the first embodiment. The image forming apparatus 1 illustrated in FIG. 1 is an electrophotographic color image forming apparatus.

The image forming apparatus 1 illustrated in FIG. 1 includes the image acquisition unit which acquires the original image and the image forming unit which forms the original image and a specific image P (described below) in the recording medium (for example, a sheet S). The image forming unit of the image forming apparatus 1 includes a transfer belt 10 and first to fourth image forming stations 11, 12, 13, and 14. The transfer belt 10 is an endless belt which rotates in a direction of arrow A in FIG. 1. The first to fourth image forming stations 11 to 14 are sequentially disposed from an upstream side to a downstream side in the rotation direction of the transfer belt 10. The first to fourth image forming stations 11 to 14 form images having first to fourth colors different from each other in the transfer belt 10.

In the first embodiment, the first to fourth image forming stations 11 to 14 have the same structure. The first to fourth image forming stations 11 to 14 each include a developing device 15, a photosensitive drum 17, and a charging device 18, and the like. The respective developing devices 15 of the first to fourth image forming stations 11 to 14 contain decolorable toners (the decolorable color materials) having the first to fourth colors different from each other. The photosensitive drum 17 is rotatably disposed to face the transfer belt 10. The charging device 18 evenly charges the photosensitive drum 17. The image forming unit of the image forming apparatus 1 further includes an image exposure unit 16. The image exposure unit 16 irradiates the photosensitive drum 17 charged by the charging device 18 with a light beam (an image light beam) according to the printing original image to be printed to expose the photosensitive drum 17. The image exposure unit 16 includes a light source for exposing the photosensitive drum 17. The image exposure unit 16 forms an electrostatic latent image according to the printing original image in the photosensitive drum 17 by exposing the photosensitive drum 17.

The image forming unit of the image forming apparatus 1 further includes a primary transfer roller 19. Furthermore, the image acquisition unit of the image forming apparatus 1 includes a scanner 20. The primary transfer rollers 19 are disposed to face the respective photosensitive drums 17 of the first to fourth image forming stations 11 to 14 with the transfer belt 10 interposed therebetween. The scanner 20 scans the original set on a document platen (not illustrated) of the image forming apparatus 1 for a copy process of the original image. The scanner 20 converts the light beam of the scanned original image into an RGB image signal and outputs the signal. An image processing unit 21 (see FIG. 4) to be described below converts the image signal into the image signals of the respective colors according to the first to fourth colors. The image exposure unit 16 controls the light source for exposure based on the image signals of the respective colors, and irradiates the photosensitive drums 17 of the corresponding first to fourth image forming stations 11 to 14 with the image light beams of the respective colors.

The developing devices 15 of the respective colors of the first to fourth image forming stations 11 to 14 develop the electrostatic latent images formed on the photosensitive drums 17 using the decolorable toners of the respective colors. The developing device 15 develops the electrostatic latent image to form the decolorable toner image of each color according to the original image on the photosensitive drum 17 of each color.

The primary transfer roller 19 disposed to face the photosensitive drum 17 of the first image forming station 11 primarily transfers a decolorable toner image of a first color formed by the developing device 15 of the first image forming station 11 from the photosensitive drum 17 to the transfer belt 10. The primary transfer roller 19 disposed to face the photosensitive drum 17 of the second image forming station 12 primarily transfers a decolorable toner image of a second color formed by the developing device 15 of the second image forming station 12 from the photosensitive drum 17 to the transfer belt 10. The decolorable toner image of the second color is stacked on the decolorable toner image of the first color. Similarly, the primary transfer roller 19 disposed to face the photosensitive drum 17 of a third image forming station 13 primarily transfers a decolorable toner image of a third color formed by the developing device 15 of the third image forming station 13 from the photosensitive drum 17 to the transfer belt 10. The decolorable toner image of the third color is stacked on the decolorable toner images of the first and second colors. The primary transfer roller 19 disposed to face the photosensitive drum 17 of a fourth image forming station 14 primarily transfers a decolorable toner image of a fourth color formed by the developing device 15 of the fourth image forming station 14 from the photosensitive drum 17 to the transfer belt 10. The decolorable toner image of the fourth color is stacked on the decolorable toner images of the first to third colors.

The image forming unit of the image forming apparatus 1 further includes a secondary transfer roller 33. The secondary transfer roller 33 is disposed to abut on the transfer belt 10 at a position on the downstream side from the fourth image forming station 14 in the rotation direction of the transfer belt 10. The secondary transfer roller 33 secondarily transfers the primarily-transferred decolorable toner images of the first to fourth colors onto the surface of the conveying sheet S.

The image forming unit of the image forming apparatus 1 further includes a sheet cassette 30, a conveyance path 31, a registration roller 32, a fixing device 34, a sheet discharging roller 35, and a sheet discharging unit 36. The sheet cassette 30 is provided at the lower portion of the image forming apparatus 1 in a detachable matter. The sheet cassette 30 contains the sheet S therein. The conveyance path 31 forms a conveyance path of the sheet S toward the sheet discharging unit 36 through the registration roller 32, the secondary transfer roller 33, and the fixing device 34. The sheets are taken out by the conveyance path 31 from the sheet cassette 30 one by one using a sheet feeding member (not illustrated) and conveys the sheet S. The registration roller 32 is disposed at a position on the upstream side from the secondary transfer roller 33 in a sheet conveyance direction. The registration roller 32 conveys the sheet S toward a secondary transfer position (a nip portion) between the secondary transfer roller 33 and the transfer belt 10 in synchronization with timing at which the decolorable toner image is primarily transferred onto the transfer belt 10. The fixing device 34 is disposed at a position on the downstream side from the secondary transfer roller 33 in the sheet conveyance direction. The fixing device 34 presses the sheet S while heating the decolorable toner image secondarily transferred onto the sheet S by the secondary transfer roller 33 at a predetermined fixing temperature. The fixing device 34 fixes the decolorable toner image onto the sheet S by heating and pressing the decolorable toner image. The sheet discharging roller 35 is disposed at a position on the downstream side from the fixing device 34 in the sheet conveyance direction. The sheet discharging roller 35, for example, is forwardly rotated to discharge the sheet S of which the first surface is fixed with the decolorable toner image by the fixing device 34 to the sheet discharging unit 36. Furthermore, the sheet discharging roller 35, for example, is reversely rotated to convey the sheet S of which the first surface is fixed with the decolorable toner image to a reversing path 37 for a two-sided printing described below. The sheet discharging unit 36 includes a sheet tray which is provided on the outside of the image forming apparatus 1. The sheet discharging unit 36 receives the sheet S discharged by the sheet discharging roller 35 using the sheet tray.

The image forming apparatus 1 further includes the reversing path 37 for the two-sided printing. The reversing path 37 is branched off from the conveyance path 31 between the fixing device 34 and the sheet discharging roller 35, and forms the conveyance path to join with the conveyance path 31 at a position on the upstream side from the registration roller 32 in the sheet conveyance direction. After the decolorable toner image is fixed onto the first surface as described above, the sheet S conveyed by the sheet discharging roller 35 is conveyed through the reversing path 37 to return the sheet to a position on the upstream side from the registration roller 32 in the sheet conveyance direction. The sheet S is returned through the reversing path 37 to a position on the upstream side from the registration roller 32 to revere the surface of the sheet S onto which the decolorable toner image is secondarily transferred.

Figure 2:
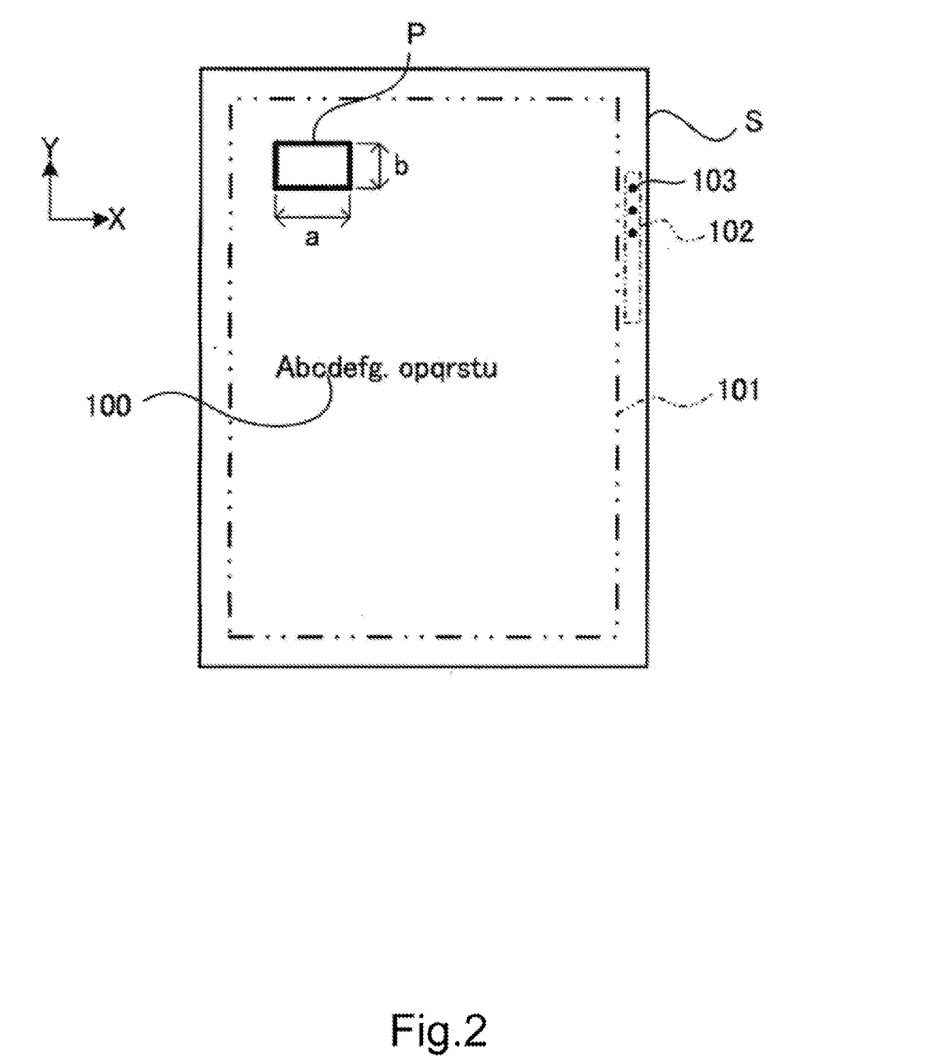
FIG. 2 is a diagram illustrating an example of a specific image printed in a sheet using a decolorable color material by the image forming apparatus according to the first embodiment.

The image forming apparatus 1 further includes a reuse mark print unit 24 and a mark read unit 23. The reuse mark print unit 24, for example, is an inkjet print unit. The reuse mark print unit 24, for example, is disposed on one end side in a direction (an X direction in FIG. 2) going straight to the conveyance direction of the sheet on the conveyance path 31 between the registration roller 32 and the secondary transfer roller 33. The printing of a reuse mark will be described with reference to FIG. 2. FIG. 2 is a diagram illustrating the sheet S on which an original image 100, a specific image P and a reuse mark 103 to be described below are printed by the image forming apparatus 1. The reuse mark print unit 24 prints the reuse mark 103 illustrated in FIG. 2 in the first surface of the sheet S conveyed by the conveyance path 31 using a non-decolorable ink as a non-decolorable color material. The reuse mark print unit 24 prints the reuse mark 103 in a reuse mark print area 102 positioned on one end side in the X direction outside an image forming area 101 where the original image 100 is printed. The reuse mark print unit 24, for example, prints one reuse mark 103 in the reuse mark print area 102 at every time when the image forming apparatus 1 prints the original image 100. Therefore, the number of reuse marks 103 indicates the number of reused times. The reuse mark print unit 24 prints the next reuse mark 103 with a predetermined interval from the previously-printed reuse mark 103 in the conveyance direction (a Y direction in FIG. 2) of the sheet. In order to set the predetermined interval, a controller 22 (described below) of the image forming apparatus 1 sets a print start timing of the reuse mark print unit 24 based on a read result of the reuse mark 103 of the mark read unit 23 and, for example, a conveyance start timing of the sheet by the registration roller. The mark read unit 23 includes two sensors which are disposed to interpose the conveyance path 31 on one end side in the X direction on the conveyance path 31 between the sheet cassette 30 and the registration roller 32. The mark read unit 23 reads the reuse mark 103 printed on both surfaces of the sheet S using the two sensors. The controller 22 (described below) of the image forming apparatus 1 counts the number of reuse marks 103 based on a read result of the reuse mark 103 of the mark read unit 23, and recognizes the number of reused times of the sheet S.

In addition to the scanner 20, the image acquisition unit of the image forming apparatus 1 includes an I/F (interface) unit 40 (see FIG. 4) which acquires the printing original image (such as a character, a figure, a picture, etc.) from a USB memory installed on a personal computer or an apparatus connected through a network. The image forming apparatus 1 prints the original image acquired by the I/F unit 40 onto the sheet S. Separately from the original image, the controller 22 (described below with reference to FIG. 4) of the image forming apparatus 1 outputs the image signal according to a unique image of the image forming apparatus 1 to the image processing unit 21 (see FIG. 4). The unique image of the image forming apparatus 1 is configured by a specific pattern. Hereinafter, the unique image of the image forming apparatus 1 will be referred to as the specific image P. The image signal according to the specific image P includes specific pattern data of the specific image P and print position information of the specific image P. The print position information of the specific image P includes a coordinate (described below) indicating the print position of the specific image P. As the specific image P, various configurations are proposed. The specific image P will be described with reference to FIG. 2. The specific image P illustrated in FIG. 2, for example, is one rectangular pattern, but the shape of the specific pattern forming the specific image P is not limited to the rectangular shape. Furthermore, the specific image P in FIG. 2 is illustrated as a visible image for the sake of the description, the actual specific image P is an image printed in a state of difficulty in visible inspection. Specifically, the specific image P is an image drawn with a very thin line and a color which is unrecognizable for human eyes. The image forming apparatus 1 prints the specific image P using the decolorable toner together with the original image 100 in the image forming area 101 for the printing of the original image 100 in the sheet S.

In a case where the image forming apparatus 1 prints the original image 100 in the unused sheet S for the first time, the print position for printing the specific image P using the decolorable toner is referred to as an initial position. The unused sheet S is a sheet which has not been reused. In other words, the unused sheet S is a sheet of which the number of reused times is "0". On the contrary, the sheet S which has been reused will be referred to as a reused sheet in the following description. In other words, the reused sheet is a sheet of which the number of reused times is "1" or more. The image forming apparatus 1 prints a new specific image P at a position different from the print position of the previously-printed specific image P by shifting the print position of the specific image P according to the number of reused times of a print process repeatedly performed using the decolorable toner. As described above, the image forming apparatus 1 prints the reuse mark 103 in the reuse mark print area 102 outside the image forming area 101 in the sheet S. The mark number of reuse marks 103 indicates the number of reused times. The image forming apparatus 1 recognizes the number of reused times of the sheet S by counting the mark number of reuse marks 103.

Figure 3A:
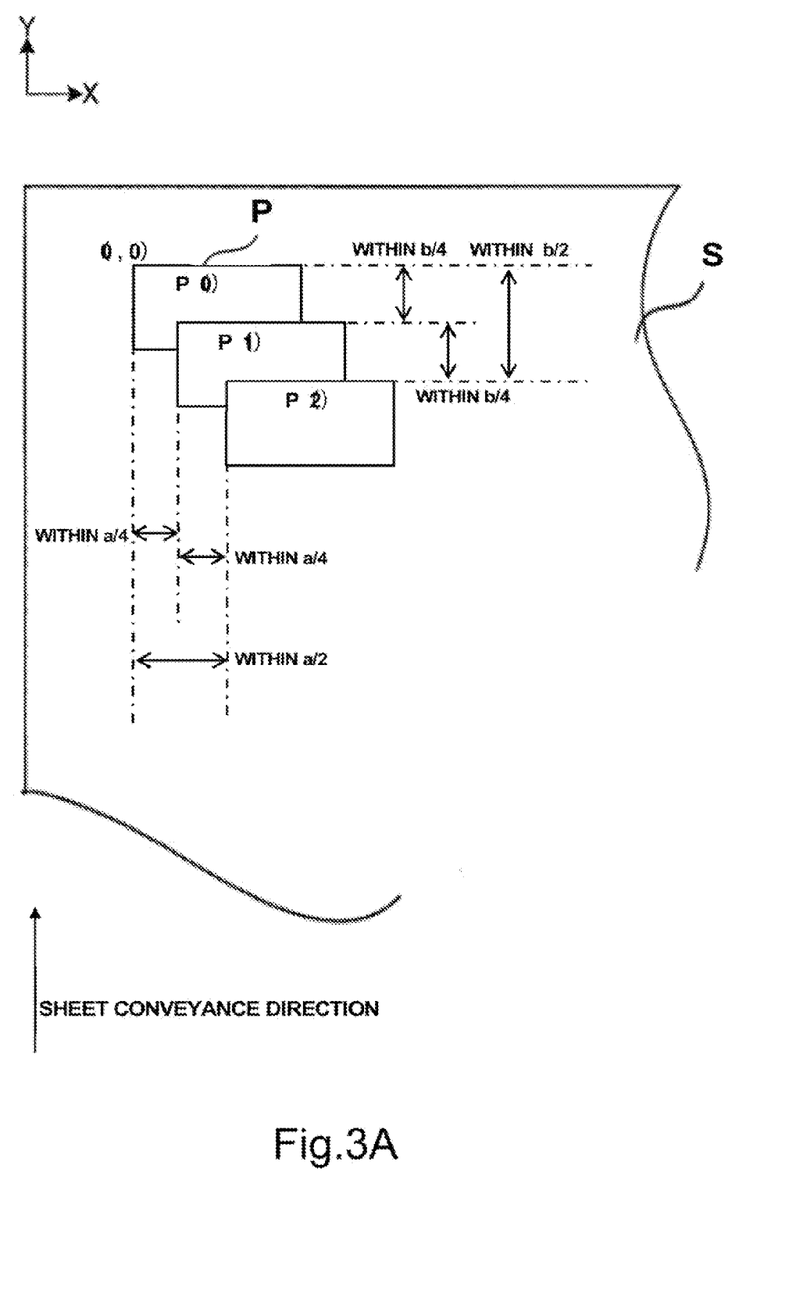
FIG. 3A is a diagram illustrating an example of a method of shifting a print position of the specific image by the image forming apparatus according to the first embodiment.
Figure 3B:
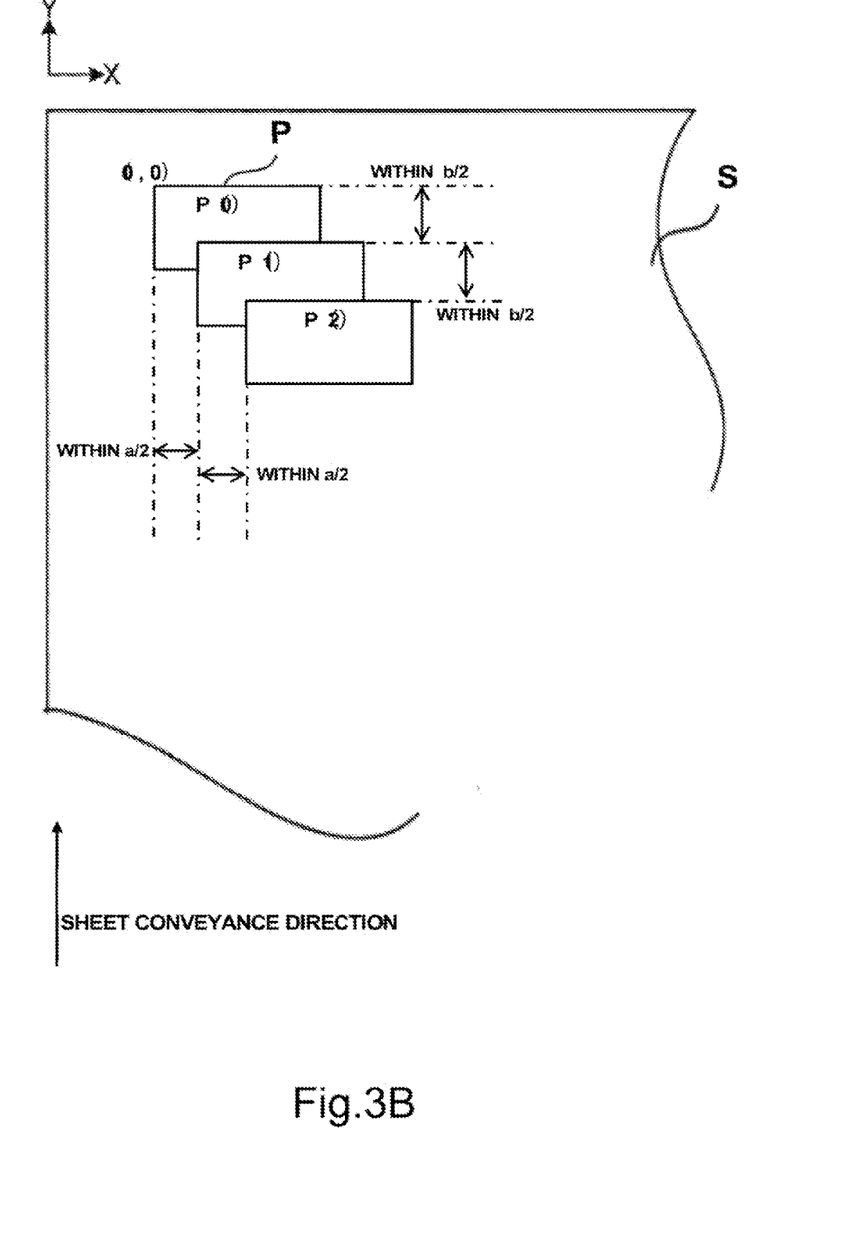
FIG. 3B is a diagram illustrating another example of the method of shifting the print position of the specific image by the image forming apparatus according to the first embodiment.

An example of a method of shifting the print position of the specific image P will be described with reference to FIGS. 2 and 3. FIG. 2 is a diagram illustrating the sheet S in which the specific image P is printed by the image forming apparatus 1 as described above. FIG. 3 is a diagram illustrating an example of a method of shifting the print position of the specific image P by the image forming apparatus 1.

In FIG. 2, a length a is the length of a long side of the rectangular shape of the specific image P in the X direction. A length b is the length of a long side of the rectangular shape of the specific image P in the Y direction. The print position of the specific image P is represented by the coordinate in the X direction and the coordinate of the Y direction, and the initial position of the specific image P is repeated by the coordinates (0, 0). In other words, in a case where the sheet S used in the printing is an unused sheet, the image forming apparatus 1 prints a specific image P (0) at the coordinates (0, 0) of the sheet S. The image forming apparatus 1 selects the image forming station of any one of the first to fourth image forming stations 11 to 14, and prints the specific image P using the selected image forming station. The selected image forming station contains the most unrecognizable color of the decolorable toner for human eyes among the decolorable toners of the first to fourth colors in the developing device 5. For example, in a case where the decolorable toner of the first color is the most unrecognizable color of the decolorable toner, the image forming apparatus 1 prints the specific image P using a first image forming station 11.

In a case where the sheet S used in the printing is the reused sheet, the image forming apparatus 1 shifts the print position of the specific image P to an arbitrary coordinates (X, Y) from the coordinates (0, 0) of the initial position within a predetermined range of the X direction and the Y direction. The predetermined range of the X direction, for example, falls within a distance of a/2, and the predetermined range of the Y direction falls within a distance of b/2.

For example, the image forming apparatus 1 sets a predetermined pitch width in consideration of an upper limit value n of the number of reused times, and obtains a shift amount of the print position from the initial position of the specific image P according to the number of reused times based on the predetermined pitch width. The image forming apparatus 1 determines the coordinates as the print position of the specific image P based on the shift amount of the obtained print position. The image forming apparatus 1 prints the specific image P at the coordinates shifted from the initial position based on the print position information of the specific image P including the determined coordinate position. The predetermined pitch width is a difference between the print position of the specific image P which is already printed in the sheet S and the print position of the specific image P which is printed in a new sheet S. The image forming apparatus 1 sets the predetermined pitch width as follows for example.

The Pitch Width $PX$ of the $X$ direction=$(a/2)/n$

The Pitch Width $PY$ of the $Y$ direction=$(b/2)/n$

In a case where the number of reused times m of the recognized sheet S is equal to or less than the upper limit value n, the image forming apparatus 1 determines the shift amount of the print position of the specific image P according to the number of reused times m as follows for example.

Shift Amount $DX$ of the $X$ direction=$\{(a/2)/n\}*m$

Shift Amount $DY$ of the $Y$ direction=$\{(b/2)/n\}*m$

Therefore, in a case where the number of reused times m of the sheet S used in the printing is equal to or less than the upper limit value n, the image forming apparatus 1 prints the specific image P at the coordinates within a range which is shifted by the shift amount DX in the X direction and the shift amount DY in the Y direction from the initial position.

More specifically, in a case where the upper limit value n of the number of reused times is "2", as illustrated in FIG. 3A, the image forming apparatus 1 sets the pitch width PX of the X direction to "a/4" and sets the pitch width PY of the Y direction to "b/4". In a case where the number of reused times m of the sheet S is "0", the image forming apparatus 1 prints the specific image P(0) at the initial position (0, 0). In a case where the number of reused times m of the sheet S is "1", the image forming apparatus 1 prints a specific image P(1) at the coordinates which are shifted by "a/4" or less in the X direction and "b/4" or less in the Y direction from the initial position (0, 0). Furthermore, in a case where the number of reused times m of the sheet S is "2", the image forming apparatus 1 prints a specific image P(2) at the coordinates which are shifted by "a/2" or less in the X direction and "b/2" or less in the Y direction from the initial position (0, 0). Further, a method of shifting the print position of the specific image P is not limited to the above method. For example, the image forming apparatus 1 may fixedly set the pitch width PX of the X direction in a/2 or less, and fixedly set the pitch width PY of the Y direction in b/2 or less regardless of the upper limit value n of the number of reused times. In this way, in a case where the predetermined pitch width is set, when the number of reused times m of the sheet S is "1" as illustrated in FIG. 3B, the image forming apparatus 1 prints the specific image P (1) at the coordinates which are shifted by a/2 or less in the X direction and b/2 or less in the Y direction from the initial position (0, 0). Furthermore, when the number of reused times m of the sheet S is "2", the image forming apparatus 1 prints the specific image P(2) at the coordinates which are shifted by a/2 or less in the X direction and b/2 or less in the Y direction from the print position of the specific image P(1).

As described above, the image forming apparatus 1 randomly shifts the coordinates (X, Y) in the sheet S of the specific image P at every print job of printing the original image. Therefore, even when the image forming apparatus 1 repeatedly reuses the sheet S, the print positions of the specific images P are less likely to overlap each other at the same position. For this reason, even when the sheet S is repeatedly reused by printing the original image 100 and the specific image P in the sheet S using the decolorable toner and then decolorating the images, printed marks of the specific image P are shifted. Accordingly, the specific image P remains difficult to be visible under the light such as sunlight or interior light.

In the first embodiment, the horizontal (right and left) direction has been described as an example for the shift direction of the specific image P in FIG. 3, but the invention is not limited thereto. The shift direction of the specific image P may be any direction, for example, the horizontal and vertical directions, an upward direction to the right, a downward direction to the left, an upward direction to the left, and the like in FIG. 3.

Herein, yellow, magenta, cyan, and black can be exemplified as the first to fourth colors of the decolorable toners contained in the respective developing devices 15 of the first to fourth image forming stations 11 to 14. The most unrecognizable color among the colors of yellow, magenta, cyan, and black is yellow. Therefore, the image forming apparatus 1 prints the specific image P in the sheet S using the first image forming station 11 of which the developing device 15 contains the yellow decolorable toner.

Hereinafter, the decolorable toner as the decolorable color material will be described.

The decolorable toner used in the first embodiment is a toner which can be decolorated. The decolorable toner includes a binder resin, an electron donating coloring agent, and an electron accepting color developer. The decolorable toner may include a decoloring agent. Furthermore, the decolorable toner may include the electron donating coloring agent, the electron accepting color developer, and the decoloring agent which are encapsulated as color material particles.

(Electron Donating Coloring Agent)

The electron donating coloring agent is mainly a leuco dye. The leuco dye is an electron donating compound with which a color can be developed by a developer. As the leuco dye, diphenylmethane phthalides, phenyl indolyl phthalides, indolyl phthalides, diphenylmethane phthalide earth, phenyl indolyl phthalide earth, fluorans, Suchirinokinorins, and diaza-rhodamine lactones are exemplified.

(Electron Accepting Color Developer)

The electron accepting color developer is an electron accepting compound in which protons are added to the leuco dye. As the electron accepting compound, phenols, phenol metal salts, carbon metal carboxylates, aromatic carboxylic acids and 2 to 5C aliphatic carboxylic acids, benzophenones, sulfonic acid, sulfonate, phosphoric acides, phosphate metal salts, acidic phosphoric ester, acidic phosphoric ester metal salts, phosphite acids, phosphite acide metal salts, monophenols, pholyphenols, 1,2,3-trazole, and a derivative thereof are exemplified.

(Decolorization Principle)

The electron donating coloring agent based on the leuco dye represented by CVL (crystal violet lactone) develops a color when it combines with the electron accepting color developer, and is decolorized when being dissociated from the developer. The decolorable toner includes a temperature control agent other than the developer and the decoloring agent, and thus is decolorized in a case where the toner is heated at a predetermined decolorization temperature. The temperature control agent is a material which has a large difference between the melting point and the solidifying point. In a case where the solidifying point of the temperature control agent is equal to or lower than a room temperature, the decolorable toner becomes a color material which maintains the decolorization state even at the room temperature. As the decolorable toner of the embodiment, a developing and decolorable color material obtained by encapsulating the electron donating coloring agent, the developer, and the temperature control agent based on the leuco dye may be used. In a case where the image forming apparatus 1 performs a decolorization process on an image printed in the sheet S, the controller 22 of the image forming apparatus 1 controls a fixing temperature of the fixing device 34 to the decolorization temperature higher than a heating temperature.

Figure 4:
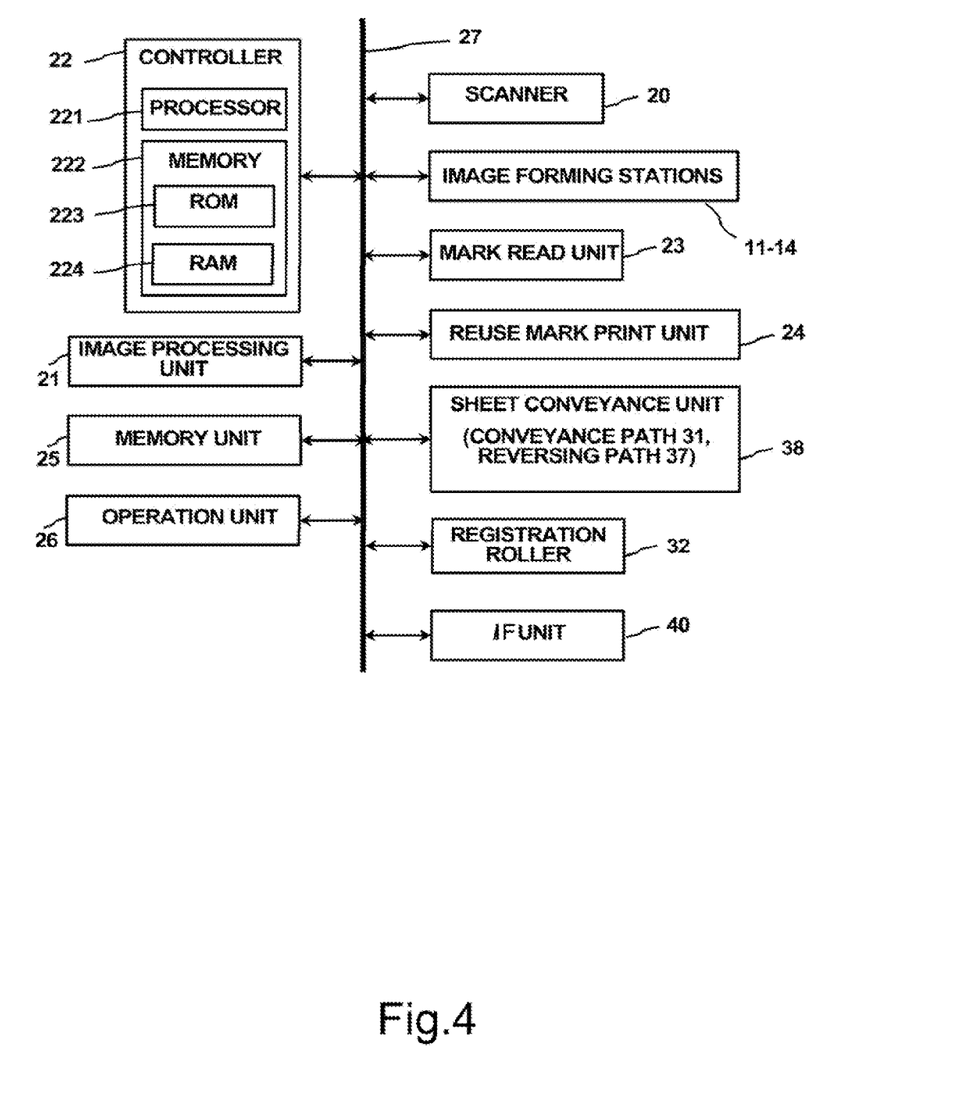
FIG. 4 is a block diagram illustrating a hardware configuration of the image forming apparatus according to the first embodiment.
Figure 5A:
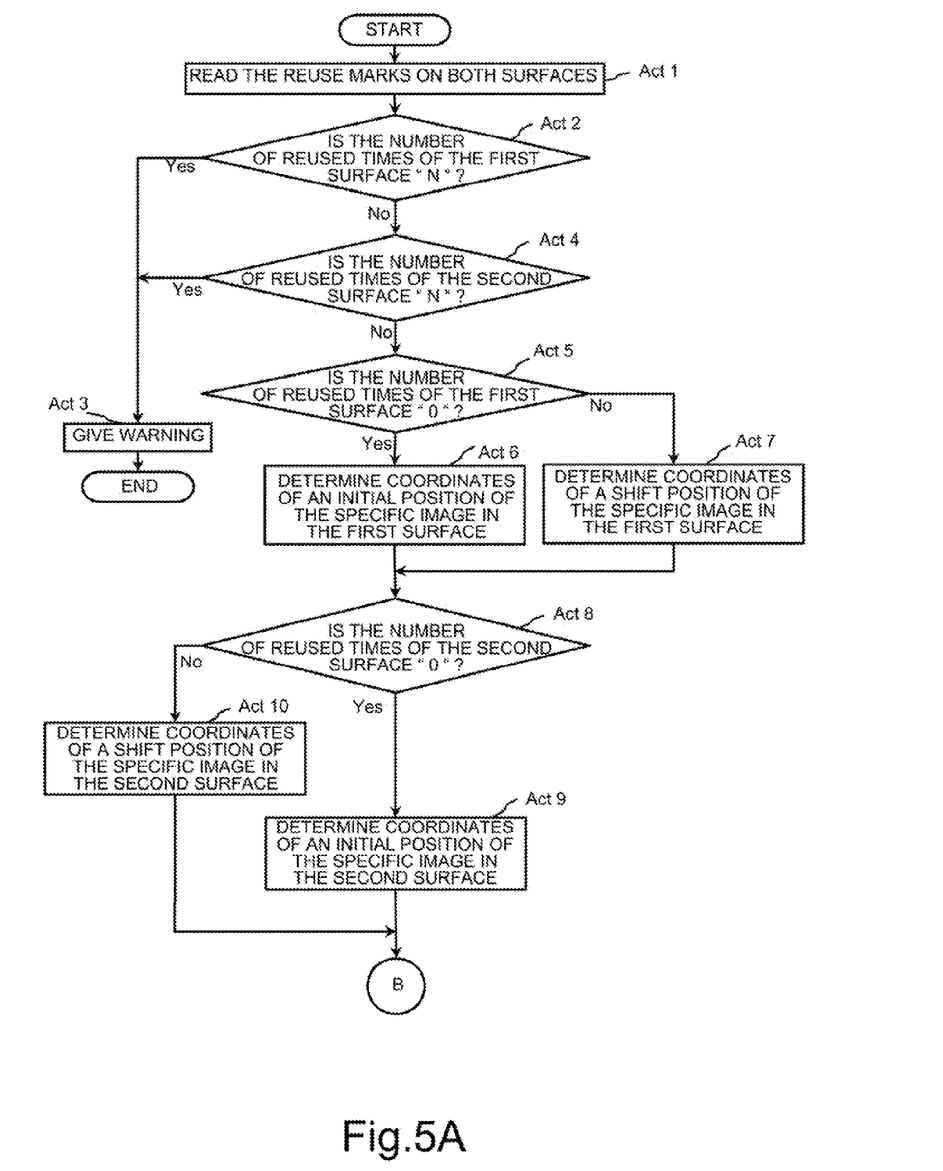
FIG. 5A is a flowchart illustrating a print process including a shift process of the print position of the specific image which is performed by the image forming apparatus according to the first embodiment.
Figure 5B:
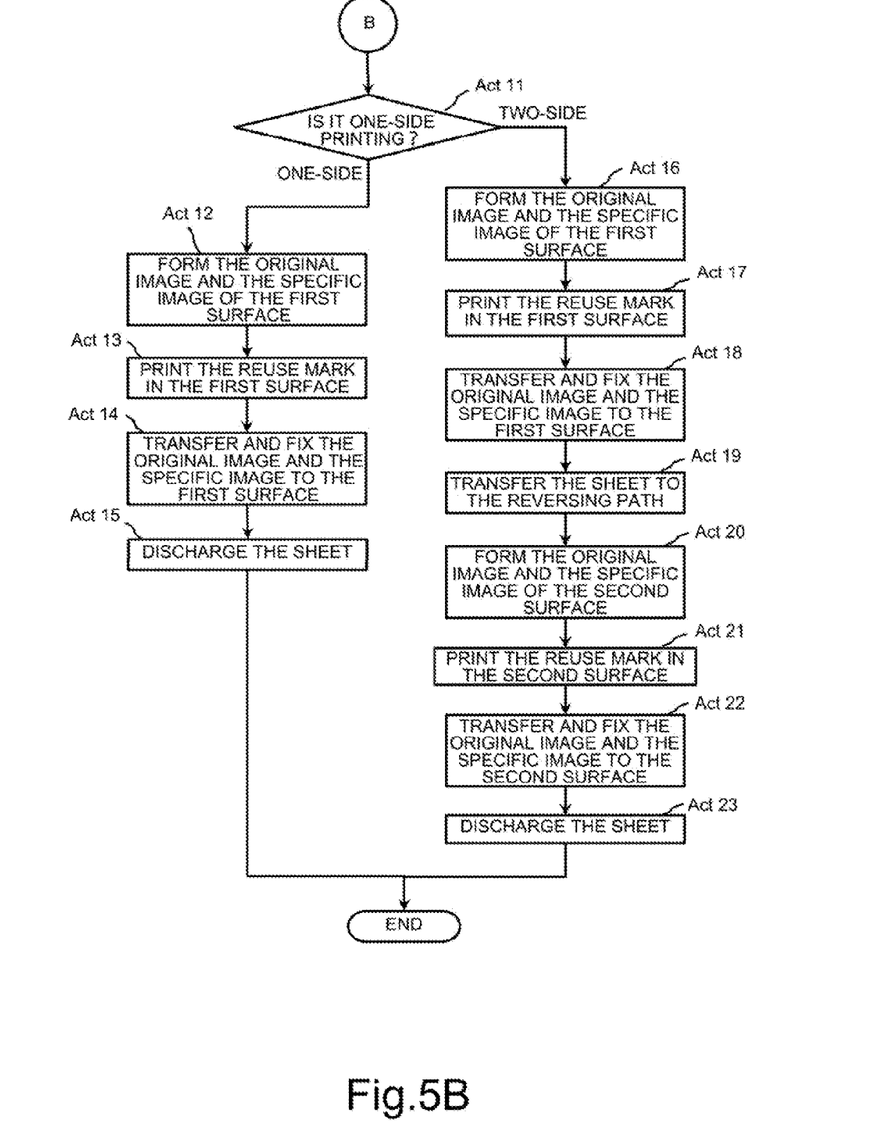
FIG. 5B is a flowchart illustrating a print process including a shift process of the print position of the specific image which is performed by the image forming apparatus according to the first embodiment.

A hardware configuration of the image forming apparatus 1 will be described with reference to FIG. 4. Furthermore, the print process including a shift process of the print position of the specific image P performed by the image forming apparatus 1 will be described with reference to FIG. 5A and FIG. 5B. FIG. 4 is a block diagram illustrating the hardware configuration of the image forming apparatus 1. FIG. 5A and FIG. 5B are a flowchart illustrating the print process including the shift process of the print position of the specific image P performed by the image forming apparatus 1.

As illustrated in FIG. 4, the image forming apparatus 1 includes, as the hardware configuration, the controller 22, the image processing unit 21, a memory unit 25, an operation unit 26, the scanner 20, the first to fourth image forming stations 11 to 14, the mark read unit 23, the reuse mark print unit 24, a sheet conveyance unit 38, the registration roller 32, and the I/F unit 40. The operation unit 26 includes an operation member and a display unit of the image forming apparatus 1 such as a start switch. The sheet conveyance unit 38 includes the sheet conveyance path 31 and the reversing path 37 for the two-sided printing. The I/F unit 40 is connected to a network (not illustrated). In other words, a bus 27 is connected to the network through the I/F unit 40. The respective units described above are connected to each other through the bus 27. The controller 22 acquires image information corresponding to the original image from a terminal apparatus such as a personal computer (not illustrated) connected to the network using the I/F unit 40. The controller 22 outputs the image signal corresponding to the original image to the image processing unit 21 based on the acquired image information.

The controller 22 includes a processor 221 and a memory 222. The processor 221 controls the entire of the image forming apparatus. The processor 221, for example, includes a central processing unit (CPU) or a micro processing unit (MPU). The memory 222, for example, is a semiconductor memory. The memory 222 includes a read only memory (ROM) 223 and a random access memory (RAM) 224. The ROM 223 stores various types of control programs. The RAM 224 supplies a temporal work area to the processor 221.

The memory 222 stores the specific pattern data of the specific image P. The specific pattern data may be stored in the memory unit 25. In a case where the image forming apparatus 1 prints the specific image P, the controller 22 outputs the image signal containing the specific pattern data of the specific image P stored in the memory 222 to the image processing unit 21, for example, together with the image signal corresponding to the original image read by the scanner 20. Furthermore, the image signal of the specific image P includes the coordinates indicating the print position of the specific image P. The image processing unit 21 converts the above image signal into image signals of the respective colors according to the first to fourth image forming stations 11 to 14 based on the image signal, and outputs the converted image signals of the respective colors to the image exposure unit 16. The image exposure unit 16 irradiates the respective photosensitive drums 17 of the first to fourth image forming stations 11 to 14 with the image light beams based on the image signals of the respective colors. The image exposure unit 16 forms the electrostatic latent images according to the specific image P and the original image on the photosensitive drum 17 by emitting the image light beams. The respective developing devices 5 of the first to fourth image forming stations 11 to 14 develop the electrostatic latent images formed on the photosensitive drums 17 using the decolorable toners of the respective colors. The respective developing devices 5 form the decolorable toner images of the respective colors on the respective photosensitive drums 17 by developing the electrostatic latent images. The electrostatic latent image according to the specific image P is developed by the developing device 5 of the first image forming station 11 as described above using the yellow decolorable toner. Therefore, the yellow decolorable toner image according to the specific image P is formed on the photosensitive drum 17 of the first image forming station 11. The respective primary transfer rollers 19 primarily transfer the decolorable toner images of the respective colors onto the transfer belt 10 from the respective photosensitive drums 17. Furthermore, the secondary transfer roller 33 secondarily transfers the decolorable toner images of the respective colors from the transfer belt 10 onto the sheet S. Through the secondary transfer, the yellow specific image P and the original image 100 are formed in the sheet S as illustrated FIG. 2. A fixing unit 34 fixes the specific image P and the original image 100 to the sheet S, so that the image forming apparatus 1 ends the print process of the specific image P and the original image 100. The coordinates contained in the print position information of the specific image P are determined based on the shift amounts DX and DY obtained according to the number of reused times of the sheet S as described with reference to FIGS. 2 and 3.

The operation unit 26 receives a process start instruction, a selection of process conditions, and settings related to the print process of the image forming apparatus 1 from a user. In a case where the operation unit 26 receives the settings of the two-sided printing process, the sheet conveyance unit 38 sends the sheet S of which the first surface is fixed with the decolorable toner image to the reversing path 37. Specifically, after the decolorable toner image transferred onto the first surface of the sheet S is fixed by the fixing device 34, the sheet conveyance unit 38 reverses the rotation of the sheet discharging roller 35 at a position in front of the sheet discharging roller 35 where the tailing edge of the sheet S conveyed on the sheet conveyance path 31 is passed. The sheet conveyance unit 38 changes the conveyance direction of the sheet S to the reverse direction and sends the sheet S to the reversing path 37 by reversely rotating the sheet discharging roller 35. The reversing path 37 reverses the surface of the sheet S to convey the sheet S up to the registration roller 32 to make a second surface of the sheet S face the reuse mark print unit 24. The registration roller 32 conveys the sheet S at a predetermined timing in a direction toward the reuse mark print unit 24 and the secondary transfer roller 33.

In a case where the operation unit 26 receives the setting of the two-sided printing process, the mark read unit 23 reads the reuse marks 103 printed in the first surface and the second surface of the sheet S. The mark read unit 23 detects the number of reused times of the first surface and the second surface by reading the reuse marks 103. For example, in a case where the number of reused times of the first surface and the number of reused times of the second surface are different, there is a concern that the next specific image may be printed overlapping the specific image P already printed on the surface of which the number of reused times is small. In order to avoid the overlap printing of the specific images P, the mark read unit 23 individually detects the number of reused times of the first surface and the second surface of the sheet. The reuse mark print unit 24 prints the decolorable toner image in the reuse mark print area 102 of the sheet S before the decolorable toner image is secondarily transferred onto the sheet S as described above. The controller 22 stores the number of reused times read by the mark read unit 23 in the memory 222. The controller 22 sets the print start timing of the reuse mark print unit 24 with respect to the sheet S conveyed by the registration roller 32 based on the number of reused times stored in the memory 222. The reuse mark print unit 24 prints the next reuse mark 103 with a predetermined interval with the previously-printed reuse mark 103 based on the print start timing. Therefore, the reuse mark print unit 24 can print a new reuse mark 103 at a predetermined position not overlapping the previously-printed reuse mark 103.

Hereinafter, the print process including the shift process of the print position of the specific image P will be described. As described above, FIG. 5A and FIG. 5B are a flowchart illustrating the print process including the shift process of the print position of the specific image P which is performed by the image forming apparatus 1. For example, in a case where a copy process is performed to print the original image obtained by the scanner 20, the image forming apparatus 1 performs the shift process of the print position of the specific image P.

In a case where the operation unit 26 receives a user's operation on a start button for a copy process start instruction, the image forming apparatus 1 takes the sheet S out of the sheet cassette 30 and conveys the sheet S through the sheet conveyance path 31. As illustrated in FIG. 5A, in Act. 1, the mark read unit 23 reads the reuse marks 103 of the first surface and the second surface of the sheet S. After the reading of the reuse marks 103, the process of the image forming apparatus 1 proceeds to Act. 2. In the processes of Act. 2, Act. 4, and Act. 5, the controller 22 of the image forming apparatus 1 determines, on each surface of the sheet S, whether the sheet S has been reused.

Specifically, in Act. 2, the controller 22 determines whether the number of reused times of the first surface exceeds the upper limit value "n" based on the number of reuse marks of the first surface of the read sheet S. In a case where the controller 22 determines that the number of reused times of the first surface exceeds the upper limit value "n", the process of the image forming apparatus 1 proceeds to Act. 3. In a case where the controller 22 determines that the number of reused times of the first surface is equal to or less than the upper limit value "n", the process of the image forming apparatus 1 proceeds to Act. 4.

In Act. 3, the controller 22 causes the display unit of the operation unit 26 to display a warning indicating that the sheet S is not reusable. Furthermore, the controller 22 ends the print process on the first surface of the sheet S.

In Act. 4, the controller 22 determines whether the number of reused times of the second surface exceeds the upper limit value "n" based on the number of reuse marks of the read second surface. In a case where the controller 22 determines that the number of reused times of the second surface exceeds the upper limit value "n", the process of the image forming apparatus 1 proceeds to Act. 3. In a case where the controller 22 determines that the number of reused times of the second surface is equal to or less than the upper limit value "n", the process of the image forming apparatus 1 proceeds to Act. 5.

In Act. 5, the controller 22 determines whether the number of reused times of the first surface is 0. In other words, the controller 22 determines whether the first surface of the sheet S is an unused sheet or a reused sheet. In a case where the controller 22 determines that the first surface of the sheet S is an unused sheet, the process of the image forming apparatus 1 proceeds to Act. 6. In a case where the controller 22 determines that the first surface of the sheet S is a reused sheet, the process of the image forming apparatus 1 proceeds to Act. 7.

In Act. 6, the controller 22 sets the print position of the specific image P to print the first surface to the coordinates (0, 0) which are the initial value. After the coordinates of the specific image P are determined, the process of the image forming apparatus 1 proceeds to Act. 8.

In Act. 7, the controller 22 calculates the shift amounts DX and DY according to the number of reused times. The controller 22 determines the coordinates of the specific image P to be printed in the first surface based on the calculated shift amounts DX and DY. After the coordinates of the specific image P are determined, the process of the image forming apparatus 1 proceeds to Act. 8. For example, for the sheet S of which the number of reused times of the first surface is 1, as illustrated in FIG. 3A (in the case of the upper limit value n=2), the controller 22 sets the coordinates which are shifted within "a/4" in the X direction and shifted within "b/4" in the Y direction with respect to the previously-printed specific image P(0) as the print position of the specific image P(1).

In Act. 8, the controller 22 determines whether the number of reused times of the second surface is 0. In other words, the controller 22 determines whether the second surface of the sheet S is an unused sheet or a reused sheet. In a case where the controller 22 determines that the second surface of the sheet S is an unused sheet, the process of the image forming apparatus 1 proceeds to Act. 9. In a case where the controller 22 determines that the second surface of the sheet S is a reused sheet, the process of the image forming apparatus 1 proceeds to Act. 10.

In Act. 9, similarly to Act. 6, the controller 22 sets the print position of the specific image P to be printed in the first surface to the coordinates (0, 0) as the initial value. After the coordinates of the specific image P are determined, the process of the image forming apparatus 1 proceeds to Act. 11.

In Act. 10, similarly to Act. 7, the controller 22 calculates the shift amounts DX and DY according to the number of reused times. The controller 22 determines the coordinates of the specific image P to be printed in the second surface based on the calculated shift amounts DX and DY. After the coordinates of the specific image P are determined, the process of the image forming apparatus 1 proceeds to Act. 11. For example, as illustrated in FIG. 3 (in the case of the upper limit value n=2), the controller 22 determines, on the sheet S of which the number of reused times of the second surface is "2", the coordinates which are shifted within "a/2" in the X direction and shifted within "b/2" in the Y direction with respect to the previously-printed specific image P(0) in FIG. 2, as the print position of the specific image P(2).

As illustrated in FIG. 5B, in Act. 11, the controller 22 determines whether it is one-sided printing or two-sided printing. Specifically, the controller 22 determines whether it is the one-side printing or the two-sided printing based on an operation received by the operation unit 26. In a case where the controller 22 determines that it is the one-sided printing, the process of the image forming apparatus 1 proceeds to Act. 12. In a case where the controller 22 determines that it is the two-sided printing, the process of the image forming apparatus 1 proceeds to Act. 16.

In Act. 12, the controller 22 controls the scanner 20 serving as the image acquisition unit and the image forming unit such as the image processing unit 21, the image exposure unit 16, the first to fourth image forming stations 11 to 14, and the primary transfer roller 19 so as to subject the first surface of the sheet S to a process of forming the decolorable toner image according to the original image and the decolorable toner image according to the specific image P on the transfer belt 10. Specifically, the controller 22 causes the scanner 20 to output the image signal according to the original image to the image processing unit 21. Furthermore, the controller 22 outputs the image signal which contains the specific pattern data of the specific image P stored in the memory 222 and the print position information of the specific image P to the image processing unit 21. The print position information is the coordinates of the specific image P determined by the controller 22 in Act. 6 or Act. 7. The image processing unit 21 converts the above image signal to the image signals of the respective colors according to the first to fourth image forming stations 11 to 14, and outputs the converted image signals of the respective colors to the image exposure unit 16. The image exposure unit 16 irradiates the respective photosensitive drums 17 of the first to fourth image forming stations 11 to 14 with the image light beams according to the image signals of the respective colors. The image exposure unit 16 forms the original image and the electrostatic latent image according to the specific image P on the photosensitive drum 17 by emitting the image light beam. The first to fourth image forming stations 11 to 14 each develop the electrostatic latent images of the original images using the above-mentioned decolorable toners of yellow, magenta, cyan, and black, and form the decolorable toner images according to the original images on the respective photosensitive drums 17. Furthermore, the first image forming station 11 develops the electrostatic latent image of the specific image P using the yellow decolorable toner, and forms the decolorable toner image of a yellow monochrome according to the specific image P on the photosensitive drum 17 of the first image forming station 11. The decolorable toner image according to the original image and the decolorable toner image according to the specific image P both are formed in an area corresponding to the image forming area 101 on the photosensitive drum 17 (see FIG. 2). The primary transfer roller 19 primarily transfers the decolorable toner image according to the original image and the specific image P from the respective photosensitive drums 17 to the transfer belt 10. The decolorable toner image in the first surface of the sheet S is formed, and the process of the image forming apparatus 1 proceeds to Act. 13.

In Act. 13, the reuse mark print unit 24 prints the reuse mark 103 (see FIG. 2) in the sheet S conveyed by the registration roller 32. Specifically, the reuse mark print unit 24 newly prints one reuse mark 103 such that the number of reuse marks 103 of the first surface read in Act. 1 is increased by "1". The reuse mark print unit 24 prints the new reuse mark 103 at a position with an interval from the position of the previously-printed reuse mark 103. After the reuse mark 103 of the first surface is printed, the process of the image forming apparatus 1 proceeds to Act. 14.

In Act. 14, the secondary transfer roller 33 secondarily transfers the decolorable toner images of the original image formed in Act. 12 and the decolorable toner image of the specific image P from the transfer belt 10 to the first surface of the sheet S. Furthermore, the fixing device 34 fixes the decolorable toner image of the original image and the decolorable toner image of the specific image P to the first surface of the sheet S. The image forming apparatus 1 ends the print process of the original image and the specific image P by fixing the decolorable toner image. After the print process onto the first surface of the sheet S is ended, the process of the image forming apparatus 1 proceeds to Act. 15.

In Act. 15, the sheet discharging roller 35 discharges the sheet S subjected to the print process on the first surface of the sheet S to the sheet discharging unit 36.

On the other end, in a case where the controller 22 determines that it is the two-sided printing in Act. 11, the image forming apparatus 1 performs the print process on the first surface of the sheet S in Act. 16 to Act. 18 similarly to Act. 12 to Act. 14. After the print process onto the first surface, the process of the image forming apparatus 1 proceeds to Act. 19.

In Act. 19, the reversing path 37 for the two-sided printing reverses the surface of the sheet S subjected to the print process on the first surface, and transfers the sheet S to the registration roller 32. After the sheet S is transferred to the registration roller 32, the process of the image forming apparatus 1 proceeds to Act. 20.

In Act. 20, the image forming apparatus 1 forms the decolorable toner image according to the original image to be printed in the second surface on the transfer belt 10 similarly to Act. 12. Furthermore, the image forming apparatus 1 outputs the specific pattern data of the specific image P and the image signal of the specific image P to the image processing unit 21, and the image signal includes the print position information of the specific image P in the second surface. The print position information in the second surface includes the coordinates of the specific image P determined by the controller 22 in Act. 10 or Act. 9. The image forming apparatus 1 forms the decolorable toner image according to the specific image P on the transfer belt 10 by outputting the image signal of the specific image P to the image processing unit 21 similarly to Act. 12. The decolorable toner image is formed in the second surface of the sheet S, and the process of the image forming apparatus 1 proceeds to Act. 21. In Act. 21, the reuse mark print unit 24 newly prints the reuse mark 103 similarly to Act. 3 such that the number of reuse marks 103 of the second surface read in Act. 1 is increased by "1". After the reuse mark 103 is printed in the second surface of the sheet S, the process of the image forming apparatus 1 proceeds to Act. 22. In Act. 22, the secondary transfer roller 33 of the image forming apparatus 1 secondarily transfers the decolorable toner image of the original image and the decolorable toner image of the specific image P from the transfer belt 10 to the second surface of the sheet S similarly to Act. 14. Furthermore, similarly to Act. 14, the fixing device 34 fixes the decolorable toner image of the original image and the decolorable toner image of the specific image P to the second surface of the sheet S. After the decolorable toner image is fixed to the second surface and the print process is ended, the process of the image forming apparatus 1 proceeds to Act. 23. In Act. 23, the sheet discharging roller 35 discharges the sheet S subjected to the print process on the first surface and the second surface toward the sheet discharging unit 36. As described above, the image forming apparatus 1 ends the print process which includes the shift process of the print position of the specific image P.

According to the first embodiment, the image forming apparatus 1 uses the decolorable toner serving as the decolorable color material to print the new specific image at a print position different from the print position where the specific image is already printed. Therefore, even when the sheet S is repeatedly reused, it is possible to avoid the specific images from being overlapping each other. Accordingly, it is possible to prevent the specific images from being recognized under a general indoor light.

According to the first embodiment, the image forming apparatus 1 prints the specific images P by shifting the print positions in the X direction and the Y direction at a predetermined pitch according to the number of reused times, but the method of shifting the print positions is not limited thereto. The image forming apparatus 1 may randomly change the coordinates as the print position without specifying a shifting direction.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
   an image acquisition unit which acquires an original image;
   an image forming unit which prints the acquired original image on a recording medium using a decolorable color material and prints a specific image on the recording medium using the decolorable color material, the specific image being substantially not visible to the human eye under standard light conditions; and
   a controller which determines whether the recording medium is a reused recording medium, arbitrarily sets a print position of the specific image on the recording medium, and controls the image forming unit to newly print the specific image at a position on the recording medium different from a print position of the previously-printed specific image when the recording medium is determined as the reused recording medium.

2. The image forming apparatus according to claim 1, further comprising:
   a mark read unit which detects a reuse mark on the recording medium indicating the number of reused times of the recording medium.

3. The image forming apparatus according to claim 2, wherein the controller determines whether the recording medium is the reused recording medium based on a detection result of the reuse mark of the mark read unit.

4. The image forming apparatus according to claim 3, wherein the controller controls the image forming unit to shift the print position of the specific image to a position different from the print position of the previously-printed specific image according to the number of reused times of the recording medium based on the detection result of the reuse mark of the mark read unit.

5. The image forming apparatus according to claim 3, further comprising:
   a reuse mark print unit which prints the reuse mark on the recording medium using a non-decolorable color material.

6. The image forming apparatus according to claim 5, wherein the reuse mark print unit prints the reuse mark on the recording medium each time that the image forming unit prints the original image and the specific image on the recording medium.

7. The image forming apparatus according to claim 2, wherein the controller controls the image forming unit to shift the print position of the specific image by a predetermined pitch each time that the recording medium is repeatedly reused.

8. The image forming apparatus according to claim 7, wherein the controller controls the image forming unit to shift the print position of the specific image within a predetermined range.

9. The image forming apparatus according to claim 8, wherein the controller sets the predetermined pitch based on an upper limit value of the number of reused times of the recording medium.

10. The image forming apparatus according to claim 9, wherein the controller sets the predetermined pitch with respect to each of a conveyance direction of the recording medium and a direction perpendicular to the conveyance direction.

11. The image forming apparatus according to claim 10, wherein the controller sets the predetermined range based on a size of the specific image.

12. The image forming apparatus according to claim 11, wherein the controller sets the predetermined range with respect to each of the conveyance direction of the recording medium to be conveyed and the direction perpendicular to the conveyance direction based on the size of the specific image.

13. The image forming apparatus according to claim 2, wherein the mark read unit detects the reused mark by reading both surfaces of the recording medium.

14. The image forming apparatus according to claim 13, wherein the controller determines whether the recording medium is the reused recording medium based on a detection result of the mark read unit for each recording medium.

* * * * *